July 11, 1944.  H. R. FISCHER  2,353,450
DIMPLING TOOL
Filed Jan. 11, 1943  5 Sheets-Sheet 1

INVENTOR.
Howard R. Fischer
BY
Raymond G. Mullee
ATTORNEY

July 11, 1944.  H. R. FISCHER  2,353,450
DIMPLING TOOL
Filed Jan. 11, 1943  5 Sheets-Sheet 2

INVENTOR.
Howard R. Fischer
BY
Raymond G. Mullee
ATTORNEY

Patented July 11, 1944

2,353,450

UNITED STATES PATENT OFFICE 2,353,450

DIMPLING TOOL

Howard R. Fischer, Detroit, Mich., assignor to Chicago Pneumatic Tool Company, New York, N. Y., a corporation of New Jersey Application January 11, 1943, Serial No. 471,950

12 Claims. (Cl. 153—21)

This invention relates to tools for making dimples in metal sheets, and more particularly to power tools for accomplishing this function.

As a preliminary to the process of flush riveting, by which rivets are installed with their heads contained within recesses in the metal, dimpling work has become an important step in the assembly of aircraft. The skin covering put on airplanes is made up of flat sheets of a light weight metal, such as aluminum alloy, these sheets being shaped and placed on the plane body with their respective edges overlapping or substantially contiguous. Internal ribs provide a support for the sheets which are secured thereto by rivets, a very large number of rivets being required. The outer rivet heads would ordinarily lie exposed on the skin surface, and, by offering resistance to the flow of air over the wings and fuselage, reduce the speed of the plane. To overcome this objection it has been proposed to sink the rivet heads into the skin in order to leave a smooth flat surface along which the air may pass without restriction. One method of accomplishing this is to form conical recesses in the sheets at the riveting positions and to use countersunk flat head rivets fitting closely within the recesses. Preferably the conical recesses are formed by dimpling, by which is meant re-forming the metal by extrusion as opposed to a cutting or metal removal operation. The dimples are formed one at a time, at positions defined by guide holes which are adapted, by the dimpling operation, to receive the rivets. Heretofore the sheets and ribs usually have been dimpled separately, and by stationary machinery which required that the work be brought to the tool and moved relatively thereto between each cycle of operation.

The present invention is directed in general to the improvement of dimpling apparatus to the end that it may operate with greater efficiency, speed and precision, and be more adaptable in use. A specific object of the invention is to embody the apparatus in a light weight portable power tool which may be applied to the work independently of a remote power source and so used to dimple sheets already in assembled relation.

Another object is to effect dimpling by squeezing together concave and convex dies, one of which is removable and the other integral with respect to the tool body, and so arranging the dies that the dimpling operation may be performed by application of the integral die to the outer sheet surface while the removable die is disposed on the opposite side of the work with a shank portion passed through a guide hole and through the integral die into cooperative relation with gripping and pulling means within the tool.

A further object is to enable the tool to be used on plural thicknesses of metal in order that, in aircraft work, a sheet and its supporting rib may be dimpled together.

A still further object of the invention is to provide the tool with hold-down means operative to maintain the work pieces in surface engagement during dimpling and to prevent distortion of the metal outside the area of the dimple.

Still another object is to embody in the tool centralizer means for guiding the shank of the removable die into the tool thereby to speed up conditioning of the apparatus for operation and to prevent marking the integral die.

In accomplishing these objects there has been provided a hand-held tool having an integral die and a removable die arranged as described, power driven means within the tool for gripping the shank of the removable die and pulling it, hold-down means including a reciprocable hold-down sleeve at the front of the tool and a pressure pad mounted on the integral die, and centralizer arms settable automatically into and out of position in front of the integral die in response to movement of the tool away from and toward the work.

Among the features of the tool are a means for regulating the pressure of the pad surrounding the integral die in order to vary its resistance in accordance with changes in the thickness of the work, and an adjustable means for locking the centralizer arms in guiding position, the arms being permitted while in guiding position movement relative to said locking means in a direction to release them therefrom.

Other objects and features of the invention, as well as structural details thereof, will be apparent from the following description when read in conjunction with the accompanying drawings, wherein.

Figure 1:
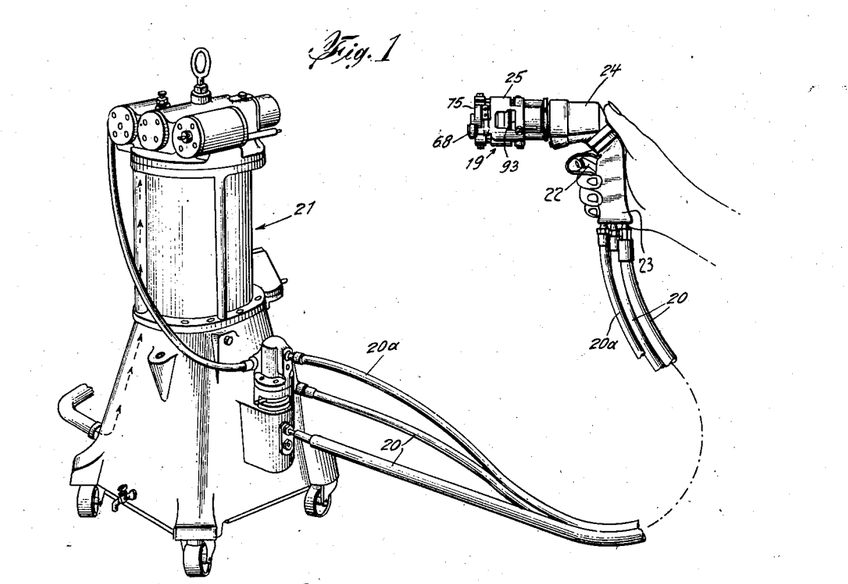
Fig. 1 is a view of the dimpling tool as a part of an assembly further comprising a power generating unit for supplying the tool with pressure fluid through connecting flexible hose lines.

Referring to Fig. 1, in the illustrated embodiment of the invention the dimpling apparatus is comprised in a hand-held tool 19, hereinafter sometimes referred to as a gun because of its resemblance to a small firearm. The tool or gun is designed for the application of hydraulic pressure delivered to it through a set of hose lines 20 leading from a generator 21. In using the assembly the power generator remains stationary or is rolled along the floor, while the gun is independently manipulated and applied to near or distant working positions within the range of the hose lines. Operation of the power generator is accomplished by remote control through actuation of a trigger 22 on the gun, which is connected to the generator by an air hose 20ª, squeezing of the trigger once serving to initiate a complete dimpling cycle.

The power generator 21 and the remote control feature thereof are not a part of this invention, but are described and claimed in the co-pending application of H. R. Fischer and E. W. Stevens, Serial No. 305,204, filed November 18, 1939, and in a divisional application Serial No. 454,973, filed August 15, 1942. Neither is indispensable to the operation of the dimpling apparatus and so they are not here described in detail.

Figures 2, 3:
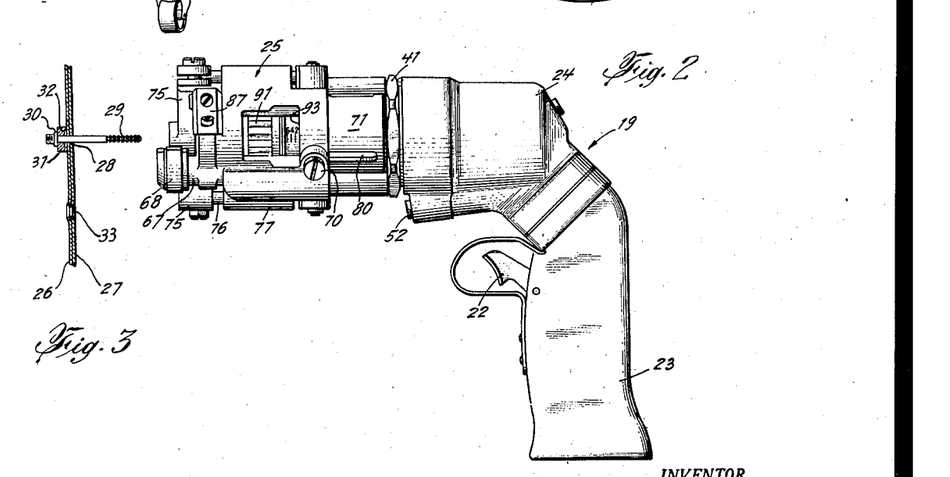
Fig. 2 is a view of the tool in side elevation, and on a larger scale than Fig. 1.
Fig. 3 is a fragmentary view of the work, showing one dimple formed and the removable die located in the next guide hole ready to be gripped and pulled.

The gun 19, as shown in Fig. 2, is composed of sub-units in the form of a handle 23, a cylinder 24, and a front end structure including gripping and pulling means surrounded by a sliding housing 25. The sliding housing is adapted for engagement with the work, and, when so engaged, to encompass the shank of the removable die which is inserted into the front end of the gun after being passed through the work from the opposite side thereof. The work, as shown in Fig. 3, generally constitutes two metal sheets 26 and 27 in surface engagement and having a series of aligned guide holes 28 in which the rivets are mounted after dimpling. The removable die, illustrated as having a shank 29 and a head 31, is moved to successive holes 28 as dimpling progresses, being placed in the work at each spaced position by passing the shank through a hole from what may be called the inside of the work, until the head contacts the inner sheet 26. The die is held in this position with the shank 29 projecting outside the work while the gun is advanced upon it and operated to effect a squeezing action between the head 31 and a convex die (not shown in Fig. 2) integral with the tool. A recess 32 in the die head 31 permits the intermediate sheets to be bent inward around the guide hole, and accordingly there is produced a dimple in the outer surface of the work, as indicated at 33 in Fig. 3.

The removable die preferably is constructed with the head and shank portions separable. The head then may be hardened and finished separately and slipped on the shank as a ring. An annular collar 30 on the shank provides a seat or limit shoulder for the head.

Figures 4, 5, 6:
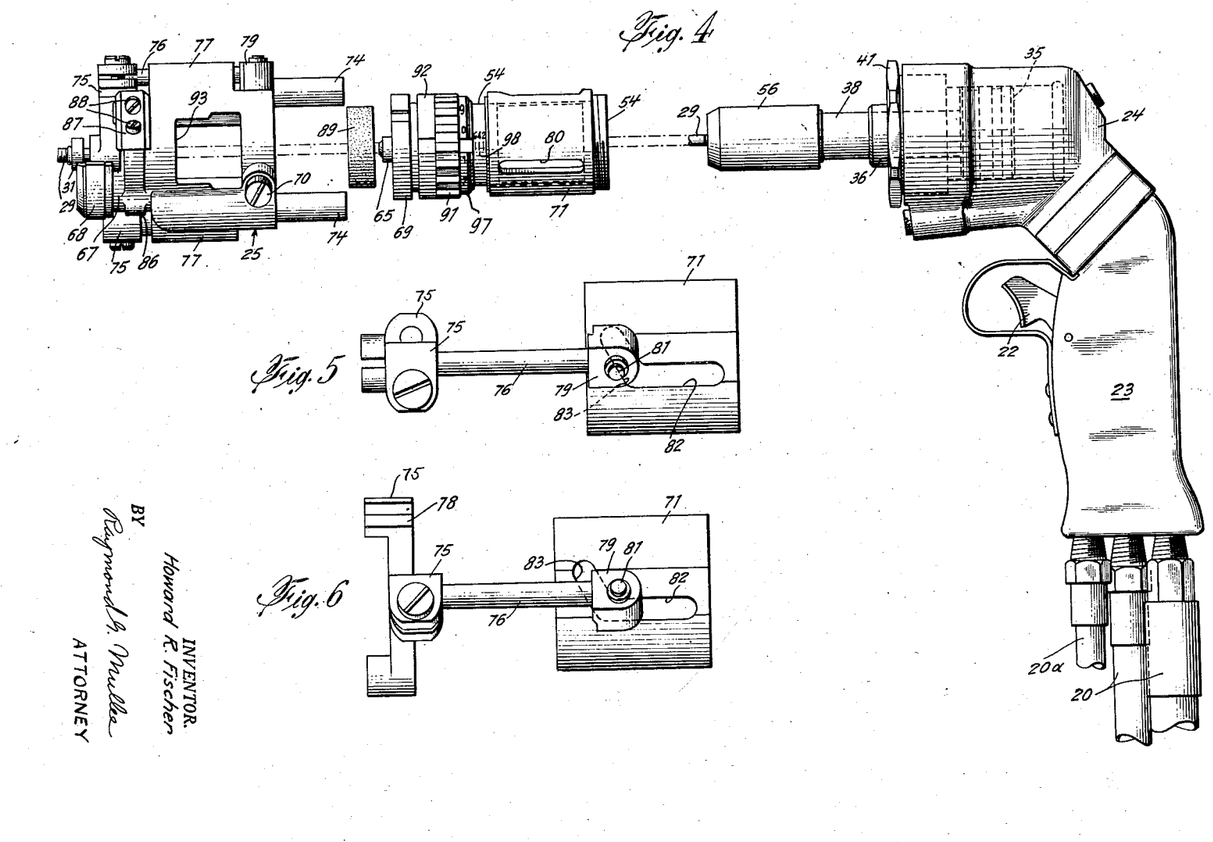
Fig. 4 is an exploded view of the tool, showing the parts in side elevation.
Fig. 5 is a detail view of the centralizer apparatus, showing the parts as they appear with the arms in guiding position.
Fig. 6 is a view similar to Fig. 5, showing the parts as they appear with the arms swung fully out of guiding position.
Figures 7, 8, 9, 10:
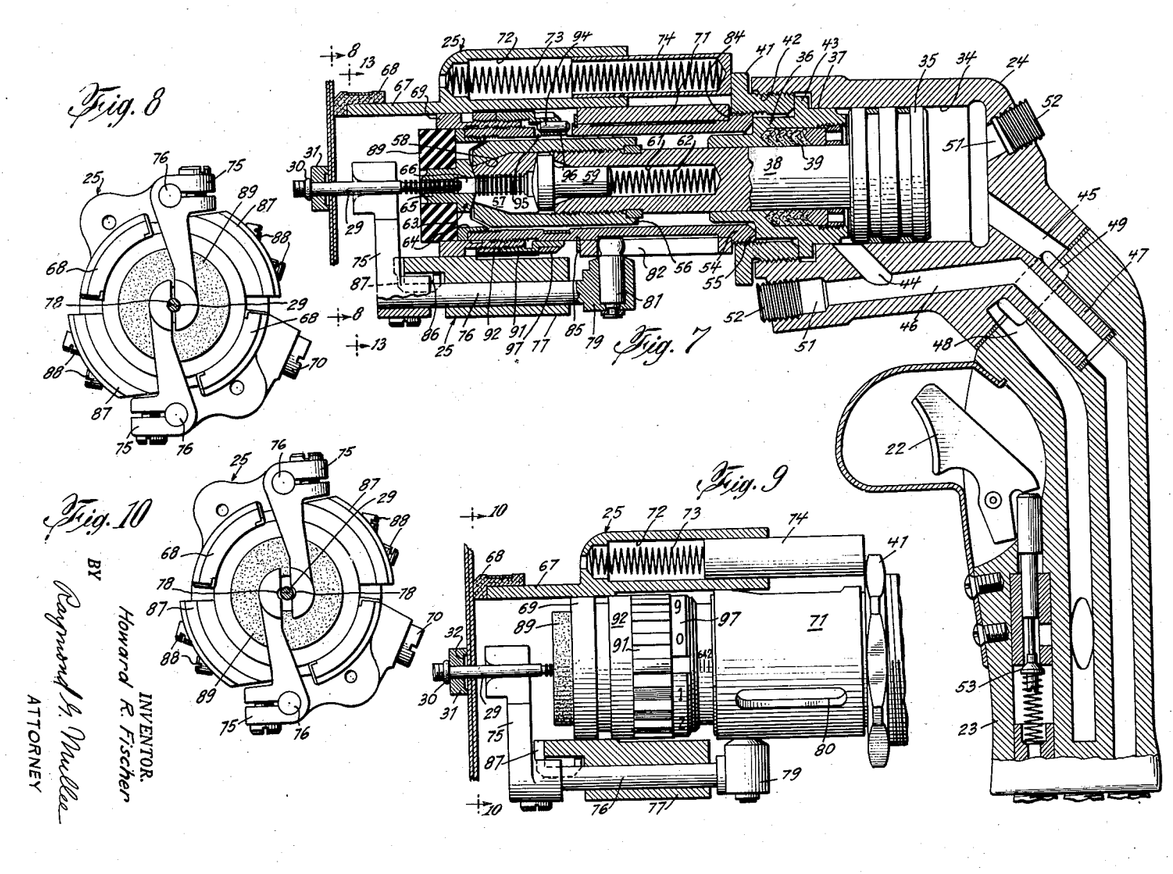
Fig. 7 is a view of the tool in longitudinal section, showing it applied to the work but before being pressed forward the distance necessary to release the centralizer arms and to bring the pressure pad and integral die into contact with the outer work surface while placing the shank of the removable die in position to be gripped and pulled.
Fig. 8 is a front end view of the tool, taken from outside the work as indicated by the line 8—8 of Fig. 7.
Fig. 9 is a fragmentary view, similar to Fig. 7, showing the tool advanced far enough toward the work to release the centralizer arms and start them moving out of guiding position.
Fig. 10 is a view similar to Fig. 8, taken along the line 10—10 of Fig. 9.

Considering the structural details of the dimpling tool or gun 19, and referring to Figs. 4 and 7, the cylinder 24 has a longitudinal bore 34 in which is disposed a reciprocable piston 35. The rear of the bore 34 is closed by the cylinder wall, while in the front of the bore is mounted a bushing 36 (Fig. 7) having a cylindrical portion 37 fitting closely within the bore. The terms "rear," "front" and their variations are used herein to indicate position relatively to the handle 23 and to the work engaging end, which are considered respectively to define the rear and front ends of the gun. The bushing 36 provides a bearing for the piston rod 38 which extends forwardly through the front of the cylinder. A packing assembly 39 is contained in a counterbore in the bushing 36 for preventing oil leakage along the piston rod. Holding the bushing 36 in position closing the front of bore 34 is a ring 41 screwed into a counterbore 42 at the front of the cylinder and engaging an annular collar 43 on the bushing.

There is thus formed in the cylinder bore 34, on opposite sides of the piston 35, front and rear chambers into which pressure fluid may be introduced to cause reciprocation of the piston and the rod 38 thereof. Respective fluid ports 44 and 45 open into the front and rear piston chambers, each being at one end of separate pressure fluid supply passages extending from the hose lines 20 through the handle 23. The port 44 communicates with a passageway 46 formed by registering passages in the cylinder and handle and passing through a projecting pilot portion 47 on the cylinder. Port 45 is connected to a passageway 48 through an annular chamber 49 surrounding the pilot portion 47 and formed by complementary recesses in the adjacent faces of the handle and cylinder. The pilot projection 47 serves as a locating means for maintaining the handle and cylinder portions of the passages 46 and 48 in full communication, and functions also as a swivel about which the handle may be turned to other positions of adjustment. The arrangement of ports and passages is such that any change in the rotative position of the handle does not affect the flow of pressure fluid to the cylinder.

Preferably, pressure is applied to the piston 35 through columns of oil which fill the communicating areas between the piston and reservoirs in the power generator. A set of cylinder ports 51 are provided for the removal of trapped air from the respective hydraulic circuits, these ports being normally closed by plug screws 52 which may be loosened to permit air to escape to atmosphere along their threads.

By the valve means disclosed in the prior application Serial No. 305,204, or by any conventional four-way valve means, the passages 46 and 48 may be alternately connected to a source of pressure and to exhaust to reciprocate the piston 35. Normally the liquid pressure is transmitted through passageway 48 while the oil in passageway 46 is free to return to the reservoir. Piston 35, therefore, normally occupies a left hand or forward position in the cylinder 24. Upon adjustment of the valve means, as by actuation of the trigger 22, passage 48 is opened to exhaust and the pressure in back of piston 35 is thereby released. Simultaneously with such action passage 46 is connected with the source of pressure and oil flows into the front piston chamber, reacting upon the bushing 36 to force the piston 35 rearward. The trigger 22 exercises remote control over the generator 21 by actuation of a valve 53 to open to exhaust a compressed air line including air hose 20ᵃ. Upon actuation of the valve 53, a cycle of operation is initiated involving the steps of releasing the pressure in the line leading to the rear piston chamber and establishing pressure in the line leading to the front piston chamber, thereby to effect the working stroke, and finally of reversing the connections to the pressure fluid source at the end of the working stroke to return the piston to the normal position of Fig. 7.

In the means it embodies for applying and for controlling the application of pressure the gun 19 is similar to the riveting gun forming a part of the assembly of Serial No. 305,204. As in that gun, whereas the piston 35 is returned to and held in normal position by the relatively low line or pump pressure, it is moved through the working stroke by intensified pressure of several tons developed by a booster device in the generator 21. Adequate power therefore is available for dimpling aluminum sheets of a wide range of thicknesses. A difference that may be noted between the dimpling gun 19 and the riveting gun of the prior application is that the working stroke is reversed. That is, in the riveter the intensified pressure is directed to the rear of cylinder bore 34 instead of to the front as in the present case. This change may be accomplished merely by switching hose lines, but preferably is done by redirecting the supply passages in the gun in order that the high pressure conduit may be the one passing through the pilot portion 47.

Forward of the cylinder 34 thereof the gun 19 is new. Still referring to Fig. 7, the ring 41 in the front end of the cylinder functions as an adapter, being threaded on its internal surface for engagement with an elongated cylinder extension 54. The extension 54 is screwed into the adapter ring and its inner end surrounds a forwardly projecting bearing portion of the bushing 36 while contacting a shoulder 55 thereon. The piston rod 38 also is an elongated member, extending beyond the bushing 36 and forward within the cylinder extension 54. Secured to the piston rod by a screw threaded connection is a chuck comprising a tubular sleeve 56 surrounding the outer end of the rod and projecting forwardly thereof. Contained within the sleeve 56, in front of the rod 38, is a set of chuck jaws 57 shaped as segments of a ring and each having a concave inner surface transversely grooved to form serrations or threads. Together, the jaws 57 define a circular recess and constitute a means for gripping the similarly grooved shank 29 of the removable die, which may be inserted into the recess through the open front end of the sleeve 56. The outer surfaces of the chuck jaws 57 slope outward and rearward from their front ends and so complement an internal inclined surface 58 on the sleeve 56. Thus, rearward movement of the sleeve 56 while the chuck jaws 57 are held against following such movement will force the jaws radially inward. Also, when closure of the jaws is interrupted, as when they reach clamping engagement with the shank of the removable die, the surface 58 acts on the jaws in a manner tending to pull them rearward with the piston rod. The open and closed positions of the jaws are illustrated respectively in Figs. 15 and 16. Axial movement of the chuck jaws relative to the piston assembly is resisted by a plunger 59 which is located with its head outside the front end of the rod 38, and with its stem extending into a bore 61 in the rod. The plunger 59 confines a compression spring 62 in the bore 61 and is urged outward thereby against the rear of jaws 57. The chuck jaws are accordingly held in engagement with the inclined sleeve surface 58 by a yielding pressure which is maintained even as the piston moves rearward. In this manner the jaws are held from following the initial rearward movement of the piston rod and sleeve 56 thereon but instead are clamped upon the shank 29 of the removable die. The removable die thus becomes a part of the piston rod assembly, and, during the remainder of the working stroke, participates in the pulling force exerted by the assembly.

In front of the piston rod assembly and arranged to lie between the chuck and the head 31 of the removable die, is a die 63 called the integral die because it is a part of the gun. The integral die has a disc shape adapted to cover the front of the cylinder extension 54 and has a cylindrical rearward portion 64 fitting into the extension and in threaded engagement therewith. The integral die lies adjacent the front end of the sleeve 56, and its inner surface normally is contacted by the ends of the chuck jaws 57. The area of the die engaged by the chuck jaws is conical in order to assist in spreading the jaws apart under the pressure of plunger 59 and thereby maintain the central chuck recess at maximum diameter to facilitate insertion of the die shank 29 therein. The front of the die 63 is formed with a central head portion 65, the nose of which has a frusto-conical shape which enters the recessed area 32 in the head 31 of the removable die. Broadly considered, the complementary faces of the die heads 31 and 65 may be said to have respectively concave and convex shapes. At present, among the surfaces within the scope of the term "convex," the frusto-conical design is preferred for the nose of the dimpling head 65. A longitudinal opening 66 in the die 63 registers with the chuck recess and provides a passage for the stem 29 of the removable die.

The integral die 63, being screwed into the outer end of the cylinder extension 54, is a part of the assembly further comprising the cylinder extension, the adapter 41, the bushing 36, the cylinder 24, and the handle 23. This assembly, when advanced upon the work and upon the removable die, carries with it the piston assembly including the chuck jaws 57 between which the shank of the removable die is caused to enter by insertion in the integral die opening 66. The rigid cylinder assembly engages the work through contact of the die head 65 with the outer work sheet 27. Under the guidance of the shank of the removable die such contact takes place at a position opposite the die head 31 which engages the inner work sheet 26. When the die parts are so positioned, with the separate die heads adjacent one another on opposite sides of the work and the threaded portion of die shank 29 surrounded by the chuck jaws 57, the trigger 22 may be actuated to begin a cycle of operation. A flow of oil under pressure thereby is started to the front of piston 35 where it acts both to press the piston rearward and to press the cylinder assembly forward. Initially, a relative rearward motion of the piston and sleeve 56 is permitted in order that the jaws 57 may be cammed into gripping engagement with the removable die shank 29. Then the piston begins to pull on the removable die, this motion being resisted by engagement of the die head 31 with the inner surface of the work. At the same time the reaction of the pulling force is applied through the bushing 36, adapter 41 and cylinder extension 54 to the integral die 63 in a direction to press the head 65 against the outer surface of the work. The opposed die heads 31 and 65 are thus squeezed together with the result that the frusto-conical end of head 65, the pressure of which is unopposed due to the recess 32 in the head 31, is sunk into the intermediate work sheets. Following formation of the dimple the application of pressure may be switched from one hydraulic circuit to the other to reverse the direction of motion of the piston 35 and effect a separating motion of the die heads 31 and 65. As the piston assembly returns forward to normal position the compression of chuck jaws 57 is relieved and these are then moved rearward and outward in chuck sleeve 56, carrying with them the spring plunger 59, to release the removable die. Such outward movement is facilitated by the tapered ends of the jaws in cooperation with convex surfaces on the die 63 and plunger 59. The gun may then be withdrawn from the work and the removable die taken from the dimpled hole.

While the above description includes all the elements essential to the performance of a dimpling operation, the present gun embodies additional features which are desirable, and in some cases necessary, in a practical commercial embodiment of the invention. One such feature is comprised in part in the previously mentioned sliding housing 25 which encircles the cylinder extension 54 and is formed with two projecting fingers 67, each having a fabric pad 68 secured thereto and overlying its outer end. The fingers 67 normally extend beyond the outer end of extension 54 and integral die 63 and are adapted to engage the work, the pads 68 being provided to prevent marring the surface of the work sheet. The housing 25 is rotatably and slidably mounted on tubular elements 69 and 71 supported on the cylinder extension 54. At diametrically opposed positions within the housing are longitudinal bores 72 each having a spring 73 disposed therein and extending outside the bore into a tube 74. Each tube 74 has a telescoping fit within a bore 72, and its closed outer end is pressed by the associated spring 73 into engagement with the front face of the adapter 41. Forward movement of the tubes 74 into their respective bores 72 as a result of relative movement between the sliding housing and tool body serves to compress the springs 73, the energy so stored in the springs being later expended in restoring the housing and the tool body to their normal positions. The fingers 67 engage the work with a forwardly exerted pressure during compression of the springs 73.

The housing 25 forms a part of a centralizer apparatus for guiding the shank 29 of the removable die through the integral die and into the chuck. The opening 66 in the integral die 63 has a diameter necessarily only slightly exceeding the diameter of the shank 29 of the removable die. Without the use of some guide means, therefore, the die shank is not easily inserted into the opening 66 and time may be wasted in each dimpling operation trying to obtain exact alignment of the shank with the opening. Moreover, with the tool in regular use the face of the die head 65 is apt to be marred or scratched by "hit or miss" insertions of the shank 29 into the opening 66, and the sharp edge defining the periphery of the opening will be blunted. Any disfigurement of the face of the dimpling die is undesirable since it produces irregularities or scars in the work surfaces which in turn induce deterioration of the metal and may cause improper setting of the rivet. The guide means resides in a pair of centralizer arms 75 located in front of the die 63 and movable out of the path thereof when the gun is brought into contact with the work. The centralizer arms are respectively secured at their base ends to oppositely disposed rock shafts 76 mounted in longitudinal bosses 77 (see also Fig. 4) in the outer surface of the housing 25. The arms 75 are fastened to the front ends of the shafts 76 which project from through bores in the bosses 77. The arms 75 have a length sufficient to place their free ends adjacent the central axis of the gun. At their free ends complementary guide portions are formed characterized by longitudinal grooves 78 cooperating to form a restricted passage for the shank of the removable die. Movement of the arms to and from a position placing the grooves 78 in cooperative relation is accomplished by rocking the arms short distances in similar directions of rotation. Thus to move the arms away from the effective or guiding position of Fig. 8 each is turned in a counter-clockwise direction (looking rearwardly) thereby to effect a separating motion of the guide portions. An opposite direction of movement of the arms causes an approaching motion of the guide portions and a return to guiding position. Operation of the guide arms is effected by oscillation of the shafts 76. The shafts project rearward of the bosses 77 as well as forward thereof, and the rear of each is formed with a block 79 carrying a follower stud 81. The rounded head of each stud 81 is engaged in a cam slot 82 formed in the tubular element 71, which thus serves as a cam sleeve. The slots 82 lie on opposite sides of the cam sleeve 71 and are the same in size and contour. The shape of the slots and the complete connection between the guide arms 75 and the cam sleeve 71 are best seen in Figs. 5 and 6. Each slot 82 is formed as an elongated longitudinal opening in the sleeve and has, at its front end, an angular inclined portion 83 in which the follower stud 81 rides in rocking the associated centralizer arm to and from guiding position. With the arms in the effective position of Fig. 8 the follower studs 81 lie adjacent the ends of the inclined portions 83 of the slots 82, as shown in Fig. 5. In response to a relative forward movement of the sleeve 71 the studs 81 are cammed downward in their respective slots thereby to rock the shafts 76 in a direction to swing the arms 75 out of guiding position, the arms reaching their maximum limit of movement in this direction when the follower studs arrive at the bottom of the inclined portion 83, as shown in Fig. 6. Return movement of the cam sleeve 71 rearward constrains the follower studs 81 to retrace their paths along inclined portions 83 and serves to reset the centralizer arms in guiding position.

The cam sleeve 71 moves axially forward and rearward relatively to the centralizer apparatus as a part of the tool body. As shown in Fig. 7, the sleeve is rotatably mounted upon the cylinder extension 54 but is held against relative axial movement, being retained on a fixed seat 84 at the rear of the extension by a spring clip 85 set in a peripheral groove in the extension. The cam sleeve and sliding housing 25 have a connection effected through the cooperation of a screw stud 70 in the housing and a longitudinal groove 80 in the sleeve (see Figs. 2 and 4). The stud 70 extends through the housing 25 into the groove 80, and so prevents relative rotary movement between the housing and sleeve while permitting relative longitudinal movement therebetween.

The centralizer arms 75 are adjustably secured to the shafts 76 and are positioned thereon so that a full retraction of the cam sleeve 71 relative to housing 25 will properly locate the arms to guide the removable die into the gun. It is necessary that the guide passage defined by the arms be maintained exactly in registry with the opening 66 in the integral die. Therefore additional means is provided for inhibiting lost motion in the centralizer apparatus. The front end of the housing 25 at the base of the fingers 67 is formed with a flange 86 on which are mounted two adjustable stops 87 in the form of channeled arcuate elements each having one edge overlying the front of the housing. As shown in Fig. 8, the stops 87 are disposed on opposite sides of the housing 25 and each has an end portion normally in contact with a respective arm 75. Each stop is secured to the housing by a pair of screws 88 which extend at divergent angles into the housing and may be variably tightened and loosened to permit minute sliding adjustments of the stop. A central position may thus be set for the arms 75 with fine precision and the arms locked in such position to insure passage of the removable die into the chuck without damage to the face of the integral die 63. The stops 87 prevent rocking motion of the arms 75 out of guiding position so that the centralizer apparatus takes part in the advance of the gun relative to the work and to the sliding housing 25 until the arms are free of the stops. For this purpose the shafts 76 are permitted a slight longitudinal movement within the bosses 77.

Functioning as a pressural hold down means is a rubber pad 89 mounted as a ring on the head portion 65 of the die 63 and confined within the surrounding forward end of the tubular element 69. The pad 89 has a thickness slightly greater than the length of the head 65 and so contacts the work ahead of the die 63. While dimpling, the rubber is compressed between the work and the end of the tool. The purpose of the pad 89 is to provide pressure on the work around the head 65 in order to prevent distortion of the flat work sheets during the dimpling operation. Different pressures must be applied to the work, depending upon the thickness of the sheets, and this is accomplished by adjustment of the tubular element 69 to cover a greater and lesser portion of the pad and thereby make it more and less yielding. The element 69 functions as a retainer, and, when adjusted to a position quite near the work, surrounds nearly all the pad 89, making the rubber quite solid and capable of withstanding a heavy pressure. As the retainer is moved rearward it exposes more of the pad and permits a greater expansion of the rubber, thus making the pad more soft or less resistant. The retainer 69 is screw threaded on to the outer end of the cylinder extension 54 and is extended or retracted with respect to the pad 89 by a turning movement relative to the extension. Rearward of its front end the retainer is reduced in diameter and therefore spaced from the inner surface of the housing 25. The exterior of the rearward portion of the retainer 69 is threaded and has screwed thereon a collar 91 and a lock nut 92, the nut being normally tightly engaged with the collar to constrain the retainer, the collar and the lock nut to rotate as a unit. The collar 91 is accessible for the grasp of the operator through openings 93 in the housing 25 (see Fig. 4) and the retainer assembly is in this manner manually set to a selected position of adjustment. Longitudinal grooves are provided in the collar 91 to facilitate manipulation thereof. The collar 91 extends rearward of the retainer 69, and in its rear portion has internal longitudinal grooves engaged by a roller 94. The roller 94 is disposed in a cut out portion 95 in the cylinder extension 54 and is pressed into contact with the collar 91 by a circular flat spring 96 inside the extension. The spring pressed roller 94 and cooperating grooves in the collar 91 constitute a detent means acting to hold the retainer assembly yieldingly in any selected position of rotation.

To simplify adjustment of the retainer 69 in exact accordance with the degree of pressure required of the pad 89 for the work at hand, there is mounted on the collar 91 a ring or dial 97 bearing numerals, as from 0 to 9. Each numeral may represent a different rotative position of the retainer assembly, and, by experiment, each numeral may be given significance as indicating (when viewed through one of the openings 93) that the retainer is properly set for a particular class of work.

The relative position of the retainer assembly on the cylinder extension 54 is precisely set by means of graduations 98 (see Fig. 4) on the extension adapted to be covered and exposed by the rear edge of the collar 91. When a number of tools are to be used in the same classes of work, as on the assembly line of an aircraft plant, they must be calibrated all to attain similar results in the same position of adjustment. This may easily be done by experimenting with a master tool until it has been adjusted to give best results on one kind of work, as for example the preparation of aluminum alloy sheets of a certain thickness to receive one-eighth inch flat head rivets. Corresponding adjustments then may be made in the other tools by turning the respective collars 91 thereof until the reading of the dial 97 and of the graduations 98 are the same as on the master tool. Each adjusted tool then is tested and the resulting dimple compared with one made by the master tool for flatness of the sheet and radius between the angle of the dimple and the sheet surface. If the dimple produced by a tool is incorrectly formed the lock nut 92 of the retainer assembly on the tool is loosened by means of a spanner wrench and the retainer 69 is turned relatively to the collar 91 to cover more or less of the pad 89. The tool again is tested and, if necessary, repeated adjustments of the retainer 69 are made until the results obtained correspond exactly to the ideal represented by the work of the master tool, whereupon the nut 92 is tightened to lock the retainer to the adjustment collar 91.

Figure 11:
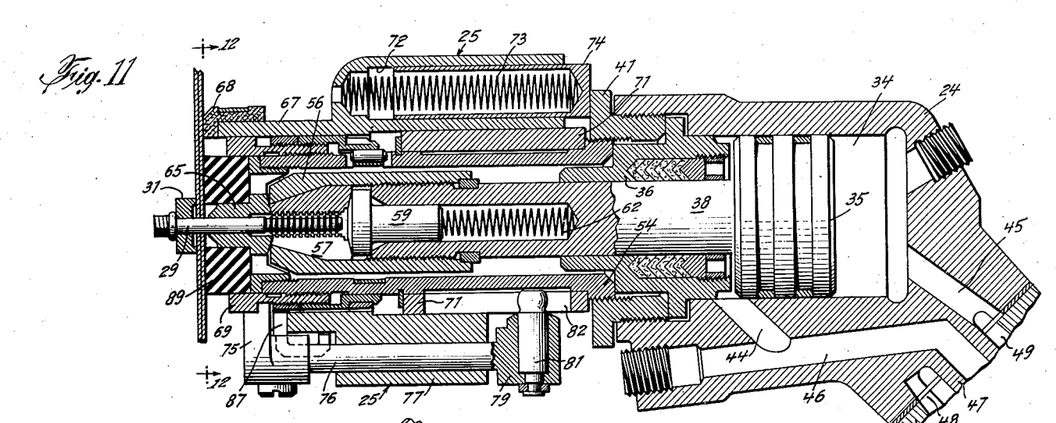
Figs. 11 and 12 are views similar respectively to Figs. 9 and 10, showing the tool fully conditioned for operation, the centralizer arms having been swung out of the path of the pressure pad and integral die which now engage the work, Fig. 12 being taken on line 12—12 in Fig. 11.
Figure 12:
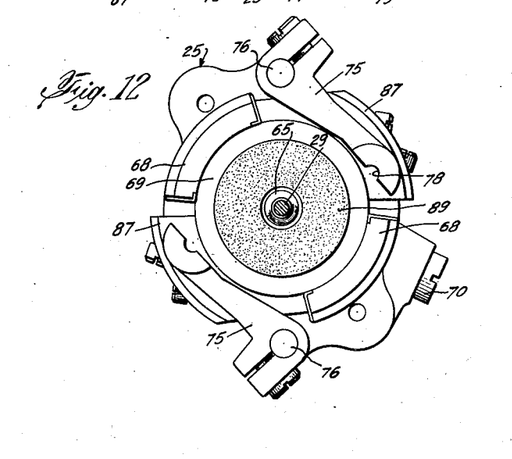
Figure 13:
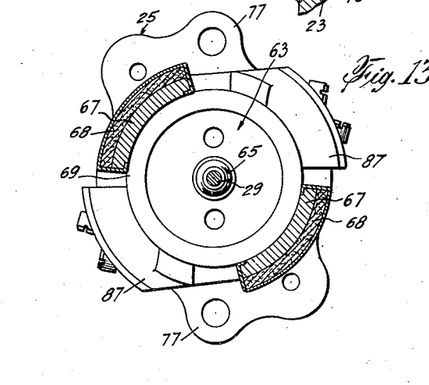
Fig. 13 is a view in cross section, taken substantially along the line 13—13 of Fig. 7, the pressure pad and centralizer arms being omitted.

Actuation of the trigger 22 to apply power to the gun is but one step in the formation of the dimple, the first step being the insertion of the shank 29 of the removable die through a rivet hole from the inside of the work, usually by a different operator from the one handling the gun. The second step consists in advancing the gun upon the work until the padded outer ends of the housing fingers 67 engage the work surface. In the course of this movement the die shank 29 is caused to enter the guide passage defined by the centralizer arms 75 and thereby is directed into the opening 66 in the integral die 63. At this time the parts appear as viewed in Figs. 7 and 8. Then, the tool handle 23 is manually pressed forward whereupon the associated cylinder elements 24, 54 etc. are caused to slide toward the work relatively to the housing 25, pushing the tubes 74 into the bores 72 to compress the springs 73 and thereby increases the pressure exerted by the housing on the work. During the first part of the advance of the tool relative to the housing 25 the guide arms 75 are moved beyond the plane of the stops 87 and begin at once to rock outward under the influence of the cam slots 82 in sleeve 71, acting on the arms through the follower studs 81 and shafts 76. The position of the parts just after the arms 75 are released from the stops 87 and begin to move out of contact with the die shank 29 is illustrated in Figs. 9 and 10. Continued forward movement of the gun turns the arms 75 farther in a direction to place them out of the path of the advancing die 63, and causes the die shank 29 to enter between the jaws 57 of the chuck. This step of the operation is completed when the rubber pad 89 contacts the outer work sheet. By this time, as shown in Figs. 11 and 12, the arms 75 have completed their travel to ineffective position and are there held by the studs 81 now disposed in the longitudinal portions of the slots 82. Also, the circumferentially grooved portion of the die shank 29 lies wholly within the chuck, the jaws 57 of which, however, remain open. The convex nose of the die head 65 lies adjacent to or in light contact with the surface of the work.

Figures 14, 15, 16:
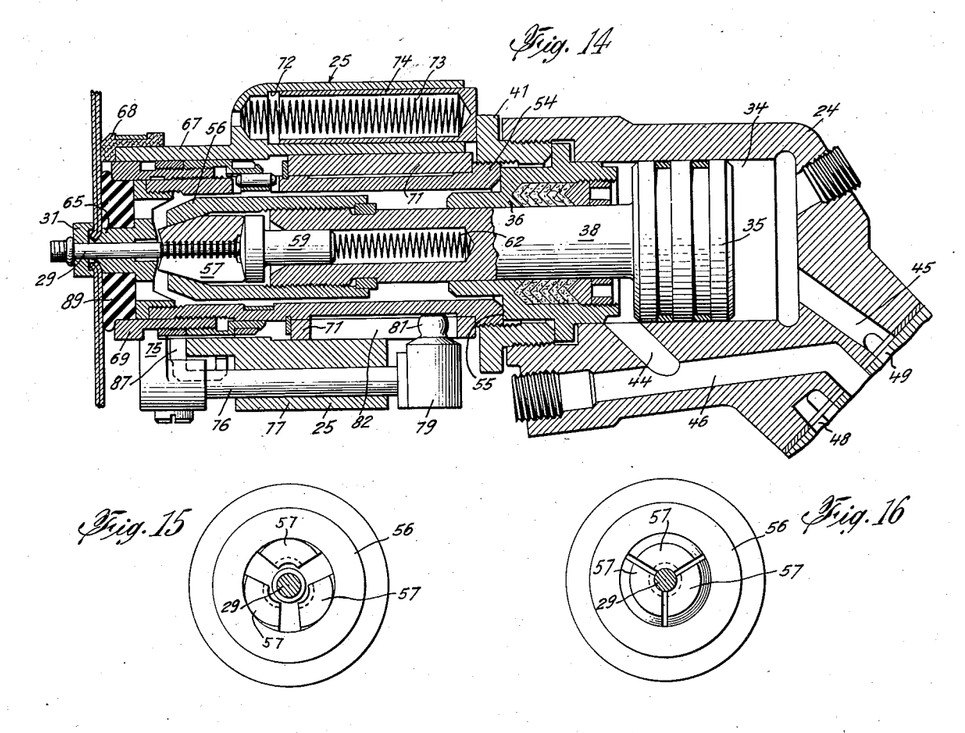
Fig. 14 is a view like Fig. 11, showing the tool after power has been applied to squeeze together the opposed dies and form the dimple.
Fig. 15 is a detail view, in front elevation, of chuck mechanism comprised in the gripping and pulling means, the mechanism being shown open or disengaged from the shank of the removable die.
Fig. 16 is a view similar to Fig. 15, showing the chuck mechanism closed or in gripping engagement with the die shank.

Now the trigger 22 is actuated to admit pressure fluid to the front of piston 35 and thereby move the piston rearward to clamp the jaws 57 upon the die shank 29 and pull the stationary die inward while pushing the tool body and integral die 63 thereof forward. The die heads 31 and 65 accordingly are squeezed together to form the dimple, as previously described, and the rubber pad 89 is compressed between the shoulder of the die 63 and the work surface and fills this area, preventing any metal distortion around the dimple. Fig. 14 shows the parts at the end of the power stroke, with the elements of the cylinder assembly advanced and the elements of the piston assembly retracted and the dimple completely formed. The pressures acting on the rubber pad 89 tend to deform it and it is allowed to expand outward between the work and the front end of the retainer 69. Termination of the power stroke and initiation of the return stroke of the piston 35 releases the removable die from the grip of the chuck jaws 57 and the gun may be withdrawn from the work. In response to the withdrawal of the manually exerted forward pressure on the tool the springs 73 effect a relative axial movement between the sliding housing 25 and the cam sleeve 71. The follower studs 81 thus are moved forward in the slots 82 and up the inclined portions 83 thereof to return the centralizer apparatus to normal.

What is claimed is:

1. A power tool for dimpling metal sheets, comprising first and second opposed dies adapted to engage the work on opposite sides thereof, the work engaging surface of said first die being concave in shape and the corresponding surface on said second die being convex in shape, a shank portion on said first die, there being an opening therefor in said second die, said shank portion being adapted to be passed through a guide hole in the work and through said second die, a cylinder constituting a principal support of the tool and having said second die secured to its outer end, movable means within said cylinder for gripping said shank and pulling it, the reaction being applied through said cylinder to said second die and the opposed dies being thereby squeezed together to sink the convex surface into the intermediate work sheet or sheets, the second die having a reduced portion terminating in said convex surface, a pressure pad closely surrounding the reduced portion and the convex surface of said second die and pressed therewith against the work surface during dimpling immediately about the portion of the latter being dimpled in order to prevent distortion of the metal around the guide hole, and a retainer for said pad mounted on the outer end of said cylinder and adjustable to confine more and less of said pad and thereby increase and reduce the resistance thereof.

2. A power tool for dimpling metal sheets, comprising a cylinder, a reciprocable piston therein, a cylinder extension, chuck mechanism within said extension, means effecting gripping and pulling motions of said chuck upon movement of said piston in one direction and a releasing motion thereof upon movement of said piston in the opposite direction, a die rigidly secured to the outer end of said cylinder extension and having a projecting head adapted to engage the work on one side thereof, a removable die having a recessed head portion adapted to engage the opposite side of the work while a shank portion is passed through a guide hole in the work and through the rigidly secured die into cooperative relation with said chuck, means for introducing pressure fluid into said cylinder to effect movement of said piston in a direction to initiate gripping and pulling motions of said chuck with respect to said removable die and apply the reaction of such force to said rigidly secured die, the heads of said removable die and said rigidly secured die being thereby squeezed together to sink the rigidly secured die into the intermediate work sheets, contact means slidably mounted on said cylinder extension and having resilient means adapting the same for making yielding contact with a portion of the work when the tool is brought into working position toward the work, and a yielding pressure pad mounted on said rigidly secured die and during the dimpling operation closely surrounding the area being dimpled in order to prevent distortion of the metal outside the area engaged by said die head.

3. A power tool for dimpling metal sheets, comprising first and second opposed dies adapted to engage the work on opposite sides thereof, the work engaging surface of said first die being recessed to receive the dimpled metal, the complementary surface on said second die being frusto-conical to form the dimple, a shank portion connected to the first die and adapted to be passed through a guide hole in the work and through a central bore in the second die, a cylinder constituting a principal support of the tool and having the second die secured to its forward end, movable means within said cylinder for gripping said shank and pulling it rearwardly, the reaction being applied in a forward direction through the cylinder to the second die and the opposed dies being thereby squeezed together to sink the frusto-conical surface into the intermediate work sheet or sheets, a rubber pressure pad closely surrounding the second die and pressed therewith against the work surface during dimpling to resist distortion of the metal around the guide hole, the pressure transmitted through the rubber pad being a component part of the forward reaction on the cylinder, and adjusting means for varying the resistance of the rubber pad and hence the force transmitted therethrough, said adjusting means comprising a sleeve surrounding the pad and movable forwardly and rearwardly to confine more or less of the rubber.

4. A power tool according to claim 3 in which the sleeve has a screw threaded connection with the cylinder.

5. A power tool according to claim 3 in which indicia are provided to show the position of adjustment of the sleeve.

6. A portable power operated tool for dimpling metal sheets comprising a cylinder, a frusto-conical die rigidly supported at the front end of the cylinder to engage the sheet metal, a resilient pressure pad closely surrounding said die and also engageable with the sheet metal, said die having a bore to receive the shank on a complementary removable die extending through the sheet metal, power means in the cylinder for gripping and pulling the shank rearwardly and applying the forward force of reaction through the pressure pad and frusto-conical die to the sheet metal to form the dimple, a centralizer for guiding the removable die shank in its relative axial movement into the bore of the frusto-conical die, said centralizer comprising a plurality of arms engageable with the shank and normally positioned in front of the frusto-conical die and pressure pad, and retracting means for automatically moving the arms out of the path of the frusto-conical die and pressure pad upon predetermined movement of the cylinder toward the sheet metal.

7. A portable power operated tool for dimpling metal sheets comprising a cylinder, a frusto-conical die rigidly supported at the front end of the cyliner to engage the sheet metal, a resilient pressure pad closely surrounding said die and also engageable with the sheet metal, said die having a bore to receive the shank on a complementary removable die extending through the sheet metal, power means in the cylinder for gripping and pulling the shank rearwardly and applying the forward force of reaction through the pressure pad and frusto-conical die to the sheet metal to form the dimple, a sliding housing mounted on said cylinder, a spring urging the housing forward relative to the cylinder, contact fingers projecting forwardly from said housing, said fingers being adapted to press against the sheet metal under the force of said spring both prior to and during the engagement of the pressure pad with the sheet metal.

8. A power tool for dimpling metal sheets, comprising a cylinder constituting a principal support of the tool and having an outer end adapted to be brought into engagement with one side of the work in alignment with a guide hole therein, a die having a head portion engageable with the opposite side of the work while a shank portion thereof is inserted through the guide hole and allowed to enter said cylinder as the cylinder is advanced thereon, gripping and pulling means within said cylinder cooperative with said shank, centralizer arms settable into and out of a fixed guiding position between the work and said cylinder for guiding the shank of said die into said cylinder and into cooperative relation with said gripping and pulling means, a centralizer arm support slidably mounted on said cylinder and arranged to extend beyond the outer end of the cylinder and thereby to contact and limit against the work while the cylinder is advanced relatively thereto, means responsive to such relative movement for releasing and shifting said arms out of the path of the cylinder and thereby out of the fixed guiding position, said spring means operable upon withdrawal of the tool from the work for effecting relative movement between said cylinder and said support in a return direction to set said centralizer arms rigidly into immovable guiding position.

9. A power tool for dimpling metal sheets, comprising a cylinder constituting a principal support of the tool and having an outer end adapted to be brought into engagement with one side of the work in alignment with a guide hole therein, a die having a head portion engageable wtih the opposite side of the work while a shank portion thereof is inserted through the guide hole and allowed to enter said cylinder as the cylinder is advanced thereon, gripping and pulling means within said cylinder cooperative with said shank, centralizer arms settable into and out of a fixed guiding position between the work and said cylinder for guiding the shank of said die into said cylinder and into cooperative relation with said gripping and pulling means, a centralizer arm support slidably mounted on said cylinder and arranged to extend beyond the outer end of the cylinder and thereby to contact and limit against the work while the cylinder is advanced relatively thereto, and means responsive to such relative movement for releasing and shifting said centralizer arms out of the path of the cylinder and thereby out of the fixed guiding position, said last named means comprising a cam and follower mechanism operable to return said centralizer arms to guiding position in response to a withdrawal of said cylinder from the work relative to said support.

10. A power tool for dimpling metal sheets, comprising a cylinder constituting a principal support of the tool and having an outer end adapted to be brought into engagement with one side of the work in alignment with a guide hole therein, a die having a head portion engageable with the the opposite side of the work while a shank portion thereof is inserted through the guide hole and allowed to enter said cylinder as the cylinder is advanced thereon, gripping and pulling means within said cylinder cooperative with said shank, centralizer arms settable into and out of a fixed guiding position between the work and said cylinder for guiding the shank of said die into said cylinder and into cooperative relation with said gripping and pulling means, a centralizer arm support slidably mounted on said cylinder and arranged to extend beyond the outer end of the cylinder and thereby to contact and limit against the work while the cylinder is advanced relatively thereto, stops fixed to the centralizer arm support capable of locking the centralizer arms positively in fixed guiding position, said centralizer arms being automatically released upon a predetermined advance of the cylinder relative to said centralizer arm support, and means responsive to the relative movement of said cylinder with respect to said centralizer arm support toward the work for shifting said centralizer arms out of the path of the cylinder and thereby out of the fixed guiding position.

11. A power tool for dimpling metal sheets, comprising a cylinder constituting a principal support of the tool and having an outer end adapted to be brought into engagement with one side of the work in alignment with a guide hole therein, a die having a head portion engageable with the opposite side of the work while a shank portion thereof is inserted through the guide hole and allowed to enter said cylinder as the cylinder is advanced thereon, gripping and pulling means within said cylinder cooperative with said shank, centralizer arms settable into and out of a fixed guiding position between the work and said cylinder for guiding the shank of said die into said cylinder and into cooperative relation with said gripping and pulling means, a centralizer arm support slidably mounted on said cylinder and arranged to extend beyond the outer end of the cylinder and thereby to contact and limit against the work while the cylinder is advanced relatively thereto, stops fixed to the centralizer arm support capable of locking the centralizer arms positively in fixed guiding position, said stops being adjustable in position to allow accurate alignment of the guiding portions of the arms with the guide hole, and means responsive to the relative movement of said cylinder with respect to said centralizer arm support toward the work for releasing and shifting said arms out of the path of the cylinder and thereby out of the fixed guiding position.

12. In a tool of the class described, a working cylinder having an extension projecting forwardly therefrom, a centralizer support mounted on the extension for axial movement relative thereto, spring means urging the support forwardly, a pair of centralizer elements each having a shaft mounted for oscillatory movement on the support about an axis parallel to the cylinder axis, said elements having arms adapted to extend radially inward from the respective shafts to engage a working implement and guide the latter for relative axial movement into the cylinder extension, cam elements interposed between the shafts and the cylinder extension and adapted to rock the centralizer arms out of the path of the tool upon movement of the cylinder forward relative to said support in opposition to said spring, and fingers upon the centralizer support engageable with the work upon forward movement of the support, whereby to effect relative movement of the support and cylinder in a direction to swing the centralizer arms out.

HOWARD R. FISCHER.

CERTIFICATE OF CORRECTION.

Patent No. 2,353,450.                                        July 11, 1944.

HOWARD R. FISCHER.

It is hereby certified that error appears in the printed specification of the above numbered patent requiring correction as follows: Page 6, first column, line 37, for "increases" read --increase--; page 7, first column, line 72, claim 7, for "cyliner" read --cylinder--; and second column, line 37, claim 8, for "said" read --and--; line 48, claim 9, for "wtih" read --with--; and that the said Letters Patent should be read with this correction therein that the same may conform to the record of the case in the Patent Office.

Signed and sealed this 5th day of September, A. D. 1944.

Leslie Frazer (Seal)                                       Acting Commissioner of Patents.